United States Patent
Camargo (10) Patent No.: US 11,357,215 B2
(45) Date of Patent: Jun. 14, 2022

(54) POULTRY FEEDER

(71) Applicant: GSI Brasil Industria e Comercio de Equipamentos Agropecuarios Ltda, Marau (BR)

(72) Inventor: Robson Pauleto Camargo, Marau (BR)

(73) Assignee: GSI BRASIL INDUSTRIA, Marau (BR)

( * ) Notice: Subject to any disclaimer, the term of this patent is extended or adjusted under 35 U.S.C. 154(b) by 22 days.

(21) Appl. No.: 16/776,331

(22) Filed: Jan. 29, 2020

(65) Prior Publication Data
US 2021/0227798 A1    Jul. 29, 2021

(51) Int. Cl.
*A01K 39/012*    (2006.01)

(52) U.S. Cl.
CPC .................................. *A01K 39/0125* (2013.01)

(58) Field of Classification Search
CPC .................................................. A01K 39/0125
See application file for complete search history.

(56) References Cited

U.S. PATENT DOCUMENTS

| | | | | |
|---|---|---|---|---|
| 4,348,988 A * | 9/1982 | Lawson | ............ | A01K 39/0125 119/53 |
| 5,092,274 A * | 3/1992 | Cole | .................. | A01K 39/0125 119/57.4 |
| 5,097,797 A * | 3/1992 | Van Zee | ............ | A01K 39/0125 119/57.4 |
| 5,311,839 A * | 5/1994 | Pollock | .............. | A01K 39/0125 119/53 |
| 5,406,907 A | 4/1995 | Hart | | |
| 5,875,733 A * | 3/1999 | Chen | .................. | A01K 39/0125 119/57.4 |
| 5,927,232 A * | 7/1999 | Pollock | .............. | A01K 39/0125 119/57.4 |
| 6,532,895 B1 * | 3/2003 | Andersen | ........... | A01K 39/0125 119/57.4 |
| 9,247,718 B2 * | 2/2016 | Pickens | .............. | A01K 39/0125 |
| 9,591,833 B1 * | 3/2017 | McGregor | ............. | A01K 39/01 |

(Continued)

FOREIGN PATENT DOCUMENTS

| | | | | |
|---|---|---|---|---|
| CN | 112312764 A | * | 2/2021 | ......... A01K 39/0125 |
| DE | 102005020670 A1 | | 11/2006 | |

(Continued)

OTHER PUBLICATIONS

UK Intellectual Property Office, Search Report prepared for UK priority Application No. GB2001207.6, dated Jul. 27, 2020.

*Primary Examiner* — Magdalena Topolski (57) ABSTRACT

The feed leveler on a poultry feeder has a plurality of feet provided on an inward facing surface of the feed skirt. A feed pan has a pedestal extending up from a pan floor configured to engage with one of the plurality of feet. Each foot is positioned at a different vertical position along a longitudinal axis of the feed leveler. The pan floor has a central core, wherein a lower portion of a drop tube extends through the central core and a retainer is fastened to a bottom end of the drop tube to mount the feed pan and feed leveler on the drop tube such that the feed pan and the feed leveler can slide along a vertical axis of the drop tube so the poultry feeder engages a ground surface on which the feed pan is received in a telescoping manner.

12 Claims, 9 Drawing Sheets

(56) References Cited

U.S. PATENT DOCUMENTS

| | | | | |
|---|---|---|---|---|
| 2008/0257270 A1* | 10/2008 | Slankard | ............ | A01K 39/0125 119/53 |
| 2013/0139755 A1* | 6/2013 | Steadier, Jr. | ....... | A01K 39/0125 119/51.01 |
| 2013/0139757 A1* | 6/2013 | Steadier, Jr. | ....... | A01K 39/0125 119/53 |
| 2019/0014751 A1* | 1/2019 | Loo | .................... | A01K 39/0125 |

FOREIGN PATENT DOCUMENTS

| | | | | |
|---|---|---|---|---|
| EP | 913085 A1 * | 5/1999 | ......... | A01K 39/0125 |
| EP | 1145631 A1 | 10/2001 | | |
| EP | 2589288 A1 | 5/2013 | | |
| FR | 2713887 A1 * | 6/1995 | ......... | A01K 39/0125 |
| FR | 2722648 A1 * | 1/1996 | ......... | A01K 39/0125 |
| KR | 20140133204 A | 11/2014 | | |
| WO | WO-0152790 A2 * | 7/2001 | ......... | A01K 39/0125 |
| WO | WO-2016067305 A2 * | 5/2016 | ......... | A01K 39/0113 |
| WO | 2018/170157 A1 | 9/2018 | | |

* cited by examiner

FIG. 8

POULTRY FEEDER

BACKGROUND OF THE INVENTION

Field of Invention

This disclosure relates to poultry feeders, and more particularly to poultry pan feeders offering multiple feed levels that can be readily set or adjusted.

Description of Related Art

In large poultry raising operations, the birds are typically housed in a long poultry house and are fed by a large number of feeders that are supplied with feed from a bulk feed tank outside of the poultry house where the feed is delivered to the feeders by a feed conveyor. The feeders and the conveyor may be raised clear of the floor by means of winch and cable system installed in the roof of the poultry house to allow for cleaning of the floor and the introduction of new bedding material. With new bedding material installed on the floor, the feeders are lowered to the floor and a new flock of young chicks is introduced into the poultry house.

Generally, there are at least two types of feeders now in use. One type of feeder has an adjustable height feed pan, such as the Hi-Lo® feeder available from the Cumberland division of The GSI Group, LLC of Assumption, Ill. Adjustable height feed pan feeders are shown, for example, in U.S. Pat. Nos. 5,311,839, 5,462,017, 5,718,187 and 7,547,888. In these last-mentioned feeders the feed pan has a relatively small amount of feed introduced into the feed pan. The initial height of the feed pan is relatively low so that the young chicks can see the feed and can readily access the feed. As the birds consume feed, the conveyor system can be actuated to add a small amount of feed to each of the feed pans. Because of a lost motion connection between the feeder and the pan, as the birds grow, the winch and cable system is operated to raise the feeders, which, in turn, increases the depth of the pan. The initially shallow depth feed pan allows the young birds to access the feed in the feed pan, and, because only a small amount of feed is deposited in the feed pan and because feed may be periodically added to the feeder, a steady supply of feed is maintained in the feed pan that will not go stale or be fouled before it is consumed. Then, as the birds grow, the feed pan depth can be increased while allowing the now larger birds to still access the feed and allowing more feed to be deposited in the feed pan without the birds raking feed from the feed pan. These adjustable depth feeders have resulted in shorter times from a flock to reach a desired market weight of the birds and in lower feed consumption.

The other type of feeder is known as a flood feeder in which a feed pan is flooded with feed for feeding young chicks. While this allows young birds to access the feed and to have a sufficient quantity of feed, such prior art flood feeders were typically not readily adjustable to offer different pre-set levels of feed for the birds. Reference may be made to U.S. Pat. Nos. 5,092,274, 6,173,676, 7,107,932, 7,228,697 and 7,552,697, which disclose prior art flood feeders in the same general field as the present disclosure.

BRIEF SUMMARY OF THE INVENTION

Briefly stated, a poultry feeder is disclosed that is configured to be installed on a feed conveyor. In accord with the feeder of the present disclosure, the feeder allows for the ready and easy adjustment of the amount of feed that is allowed to enter the feed pan so as to correspond to a plurality of predetermined feed levels. The poultry feeder is used in a poultry house with a feed conveyor having a rigid conveyor tube configured to receive a plurality of such poultry feeders at spaced intervals so that feed conveyed by the feed conveyor may be delivered to each of the poultry plurality of feeders upon operation of the feed conveyor. The poultry feeder has a drop tube for receiving feed from the conveyor tube that has an upper attachment portion that mounts the drop tube to the conveyor tube. A feed leveler is mounted along the drop tube, the feed leveler having a lower skirt. A feed pan having a pan floor is positioned such that there is a space between the pan floor and the lower skirt of the feed leveler for the passage of feed from the drop tube in order to establish a layer of feed in the bottom of feed pan. A middle body portion of the drop tube has a diameter that is smaller than a diameter of the feed level tube of the feed leveler such that the middle body portion nests within the feed leveler. The feed leveler has a plurality of feet provided on an inward facing surface of the feed skirt, and the feed pan has a pedestal extending up from the pan floor configured to engage with one of the plurality of feet, wherein each foot of the plurality of feet is positioned at a different vertical position along a longitudinal axis of the feed leveler. The pan floor of the feed pan has a raised central core with a mounting ring at the top thereof, wherein a lower mounting portion of the drop tube extends through the mounting ring of the feed pan and a retainer is fastened to a bottom end of the lower mounting portion to mount the feed pan and feed leveler on the drop tube such that the feed pan and the feed leveler can slide along a vertical axis of the drop tube and the central core provides a space for movement of the retainer and the bottom of the drop tube with respect to the feed pan so the poultry feeder engages a ground surface on which the feed pan is received in a telescoping manner.

This summary is provided to introduce concepts in simplified form that are further described below in the Description of Preferred Embodiments. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

DESCRIPTION OF PREFERRED EMBODIMENTS

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Figure 1:
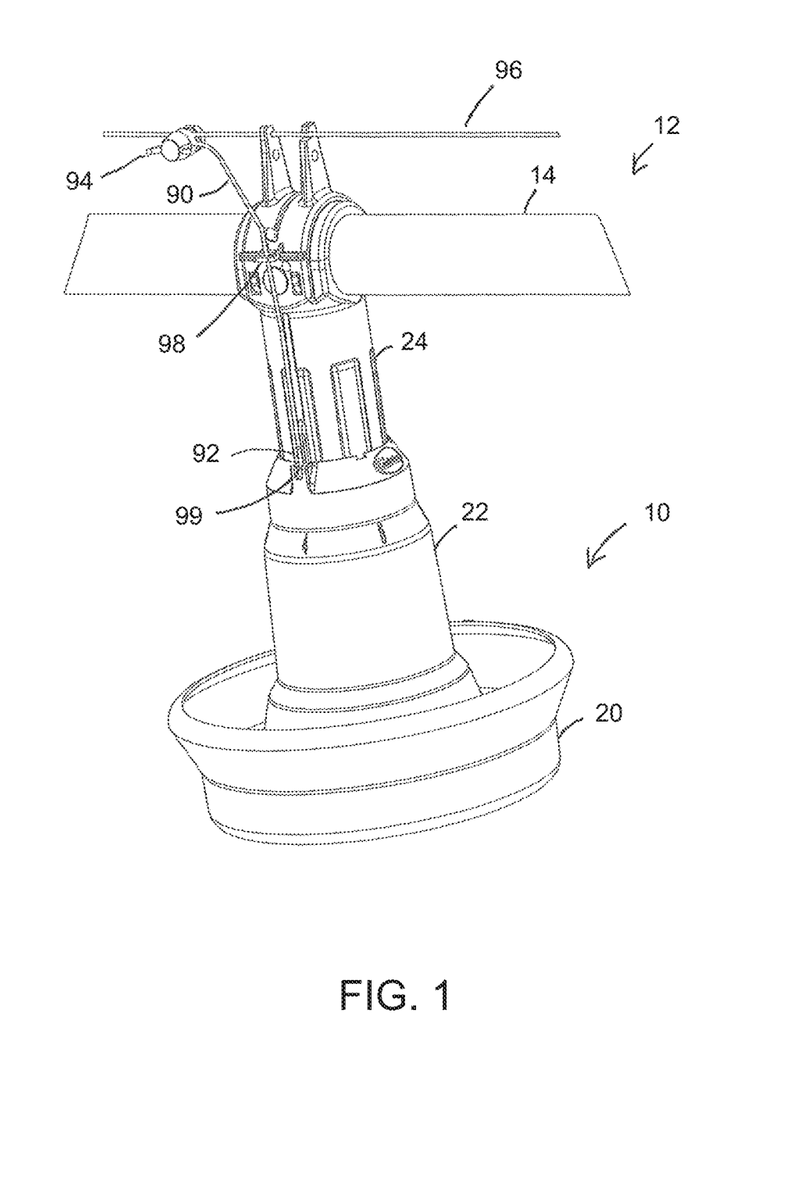
FIG. 1 is a perspective view of the feeder of the present disclosure.

Referring initially to FIG. 1 of the drawings, a poultry feeder, such as a chick broiler pan feeder, is illustrated generally by reference number 10. By way of background and as would be understood by one skilled in the art, several feeders 10 of the type illustrated in FIG. 1 are used together with a feed conveyor 12 in a poultry house (not shown) to deliver feed that is typically stored in a bulk feed tank (also not shown) located outside of the poultry house in a manner well known to those skilled in the art. The feed conveyor 12 comprises a rigid conveyor tube 14 that extends a relatively long distance within the poultry house and has a multiplicity of feeders 10 operatively connected to the conveyor tube 14 at spaced intervals therealong. As is well known to those skilled in the art, the feed conveyor tube 14 has a plurality of bottom-facing openings, one for each feeder 10, preferably spaced along the length of the feed conveyor tube 14 so that feed conveyed by the feed conveyor 12 may be delivered to each of the feeders 10 upon operation of the feed conveyor 12.

The feed conveyor tube 14 is typically suspended from the ceiling or roof of the poultry house by means of a well-known winch and cable assembly (not shown) that may be selectively operated to raise or lower the conveyor tube and all of the feeders 10 connected thereto. In operation, the winch and cable assembly is adjusted so that the feeders 10 may rest on the floor of the poultry house in a winch-down condition. The winch may be operated to begin to lift the feeders 10 from the floor in a winch-up condition. The winch also may be operated to lift all of the feeders 10 well above the floor to allow for the ready cleanout of the poultry house and the addition of new bedding material. Once the new bedding is in place, the winch system is operated to lower the feeders onto the bedding.

Figure 2:
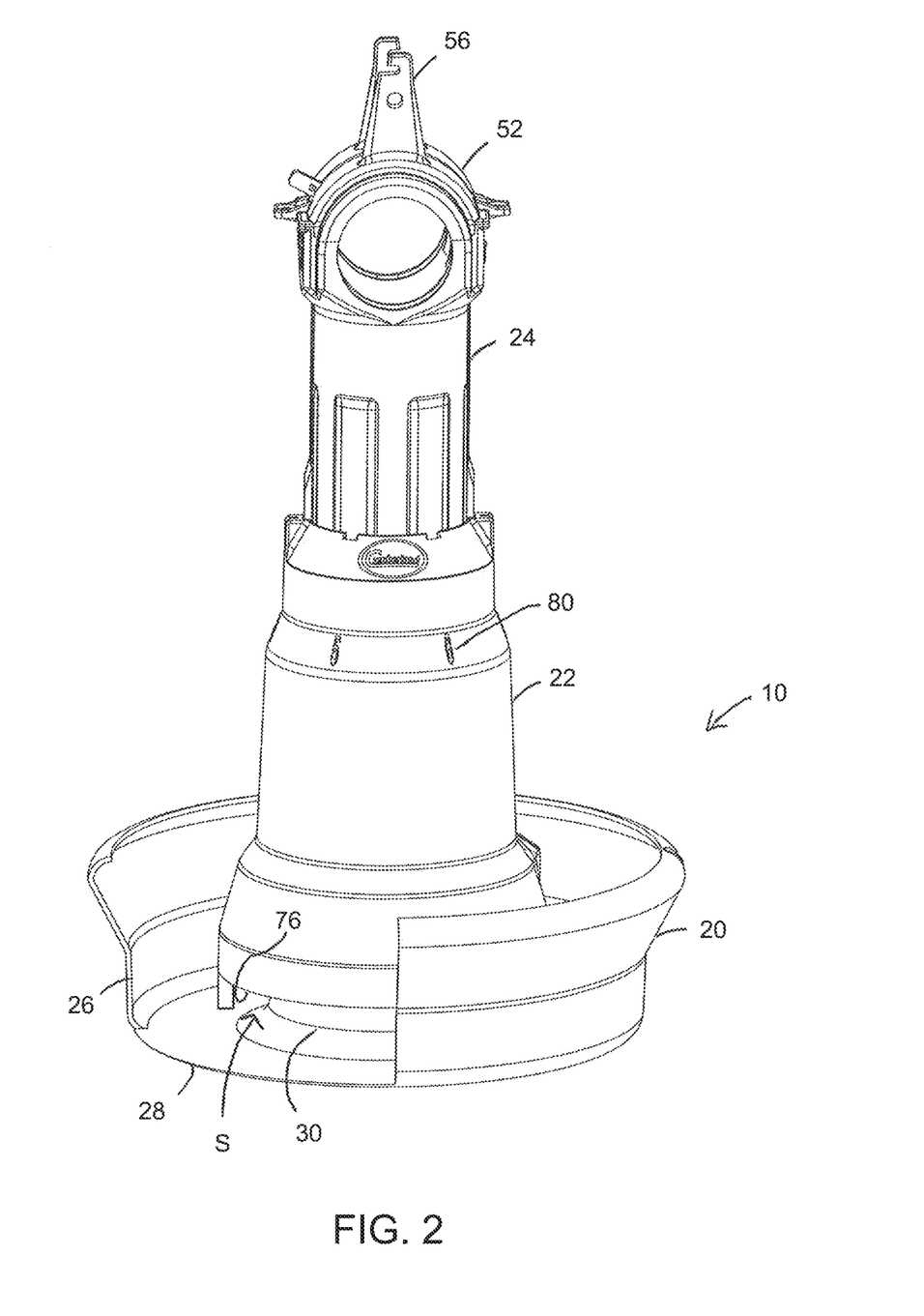
FIG. 2 is a view similar to FIG. 1 with a portion of the feeder shown in cross section to illustrate the relationship of the various components of the feeder.
Figure 3:
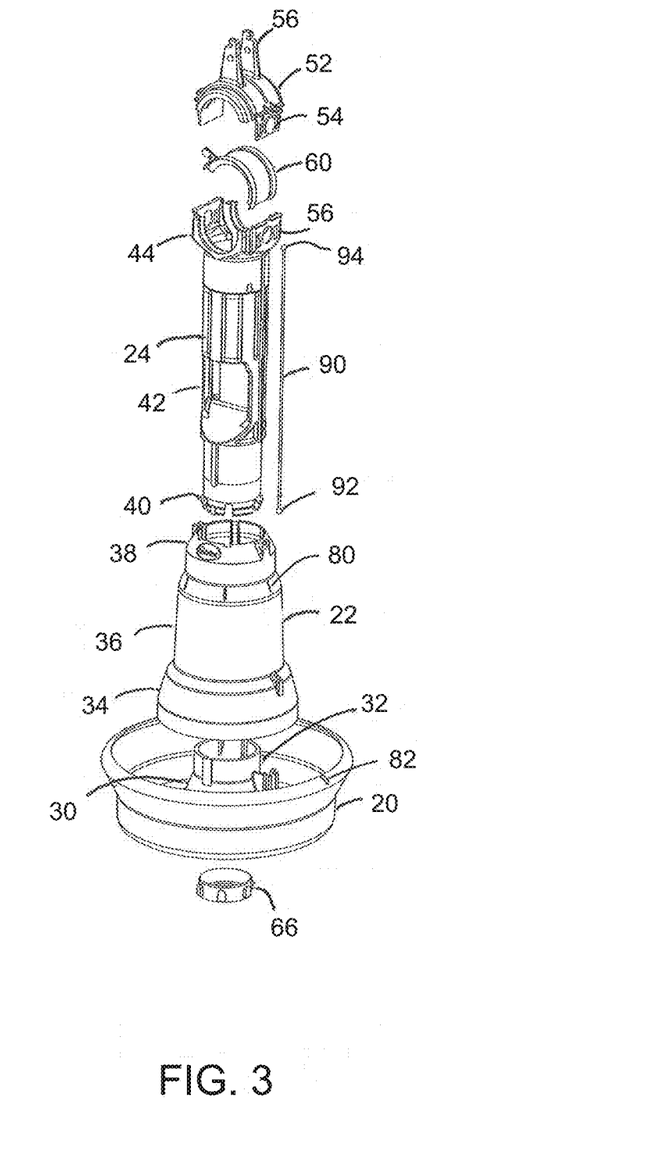
FIG. 3 is an exploded perspective view of the feeder.

Referring also now to FIGS. 2 and 3, the feeder 10 includes a feed pan 20, a feed leveler 22 rotatably engagable with the feed pan 20, and a drop tube 24, wherein the feed pan 20 and feed leveler 22 are telescopingly engagable with the drop tube 24. The feed pan 20 includes a pan sidewall 26 and pan floor 28 surrounding a raised central core 30. In the illustrated embodiment, the central core 30 is shown to be generally frustoconical in shape and has a cylindrical mounting ring 32 at the top thereof. The feed leveler 22 has a lower skirt 34 that desirably flares outwardly, an upwardly extending feed level tube 36, and an upper rim 38. It will be appreciated that with the feed leveler 22 in its operative position, as perhaps best shown in FIG. 2, there is a space S between the pan floor 28 and the lower skirt 34 of the feed leveler 22 for the passage of feed over the upper surface of central core 30 in order to establish a layer of feed in the bottom of feed pan 20 as will be described in more detail below.

Figure 4:
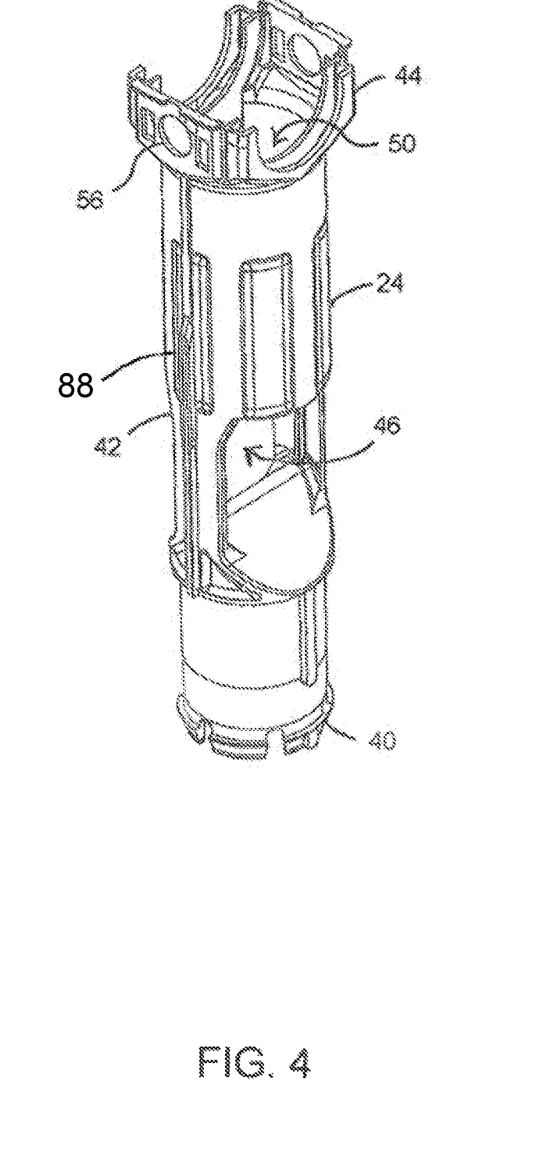
FIG. 4 is a perspective view of a drop tube of the feeder.

Turning also now to FIG. 4, the drop tube 24 includes a lower mounting portion 40, a middle body portion 42 and an upper attachment portion 44. One or more (and preferably a plurality of) feed flood windows 46 are spaced around the middle body portion 42 of the drop tube 24. The upper attachment portion 44 is shaped for receiving the bottom portion of the conveyor tube 14 as would be understood by one skilled in the art and has an opening 50 to receive feed from an aligned opening in the conveyor tube 14. The opening 50 is fluidically connected to the feed flood windows 46 in the middle body portion 42 of the drop tube 24 such that feed entering the drop tube 24 through the opening 50 will flow through and then out of the feed flood windows 46. A top cap 52 mates with the upper attachment portion 44 to secure the drop tube 24 to the conveyor tube 14. The top cap 52 has a catch mechanism 54 (as best seen in FIG. 3) which is adapted to engage with a corresponding catch mechanism 56 on the upper attachment portion 44 so that the top cap 52 may release the drop tube 24 from the conveyor tube 14 when it is desired to remove the feeder 10. Desirably, the catch mechanisms 54, 56 permit the feeder 10 to be readily removed from the conveyor tube 14 without the use of even simple hand tools. One skilled in the art will understand that the top cap 52 may latch to the drop tube 24 with any suitable latching mechanism 54, 56 using sound engineering judgment such that the latching connection is able to bear the weight of the feeder 10 as the feeder is lifted off the floor and supported by the connection of the drop tube 24 and top cap 52 around the feed tube 14 of the feed conveyor 12 of the poultry house.

To install a feeder 10 on a feed conveyor tube 14, at a location of a selected bottom facing outlet opening of the feed tube 14, a feeder 10 with top cap 52 removed is brought into engagement with the conveyor tube 14 at the location of a selected opening and the top cap 52 is snapped into place on to the upper attachment portion 44 of the drop tube 24. It will be appreciated that the upper attachment portion 44 and the top cap 52 are preferably sized so as to surround the conveyor tube 14 to prevent undue leakage of feed, but also so as to allow the feeder 10 to swing in a plane generally perpendicular to the horizontal axis of the feed conveyor tube such that if a bird bumps into the pan sidewall 26 of the feed pan 20, the feeder 10 is not rigidly fixed relative to the conveyor tube 14 and the feeder 10 will rotate or swing on the feed conveyor tube 24. At the upper end of the top cap 52, an attachment 56 is provided for an anti-roost wire 58 (FIG. 8) as would be understood in the art.

The feeder 10 further includes a shut-off slide, as generally indicated at 60. The shut-off slide 60 is provided in the upper portion of the drop tube 24 to selectively block the flow of feed into the upper attachment portion 44 or to allow and to regulate the amount of feed that enters the drop tube 24 from the feed conveyor 12. Desirably, the shut-off slide 60 is provided with stops that latch the shut-off slide 60 relative to the drop tube 24 in different positions so as to fully block, partially open, or fully open the opening in the conveyor tube 14 in register with the opening 50 in the drop tube 24 so as to have a high, medium and low supply of feed from the conveyor tube 14 into the drop tube 24, as determined by the position of the shut-off slide 60. It will be appreciated that in some operating circumstances, it may be desirable for an operator to be able to block the flow of feed to certain of the feeders 10 in a poultry house. Thus, the shut-off slide 60 provides an easy way for such feeders 10 to be de-activated without having to remove the feeder 10 from the feed conveyor 12.

The middle body portion 42 of the drop tube 24 has a diameter that is slightly smaller than a diameter of the feed level tube 36 of the feed leveler 22 such that the middle body portion 42 nests within the feed leveler 22 with the upper attachment portion 44 extending through the upper rim 38 thereof. The lower mounting portion 40 extends through the cylindrical mounting ring 32 of the feed pan 20 and a retainer 66 is fastened to a bottom end of the lower mounting portion 40 to keep the feed pan 20 and feed leveler 22 on the drop tube 24. The retainer 66 may mate with the lower mounting portion 42 using a threaded connection, detents, bolts, or any other suitable removable connection using sound engineering judgment. The central core 30 of the feed pan has a diameter sufficient that the retainer 66 fits within the underside of the central core 30 such that the feed pan 20 can rest on the bedding of the poultry facility without interference from the retainer 66.

Figure 5:
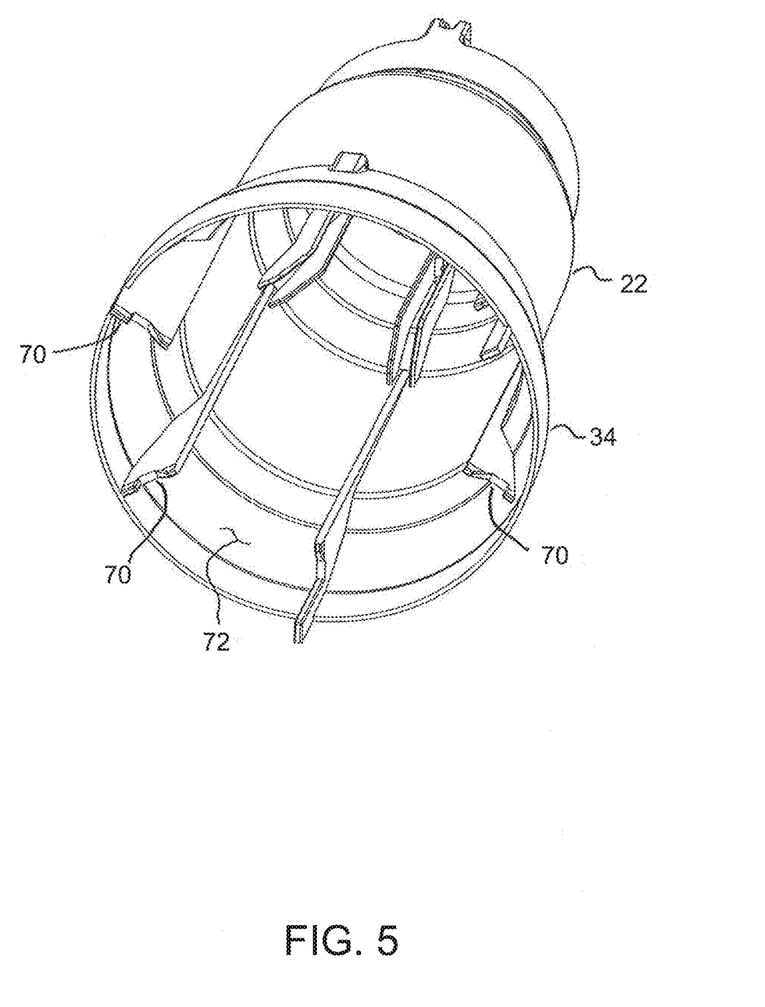
FIG. 5 is an underside perspective view of a feed leveler for the feeder.
Figure 6:
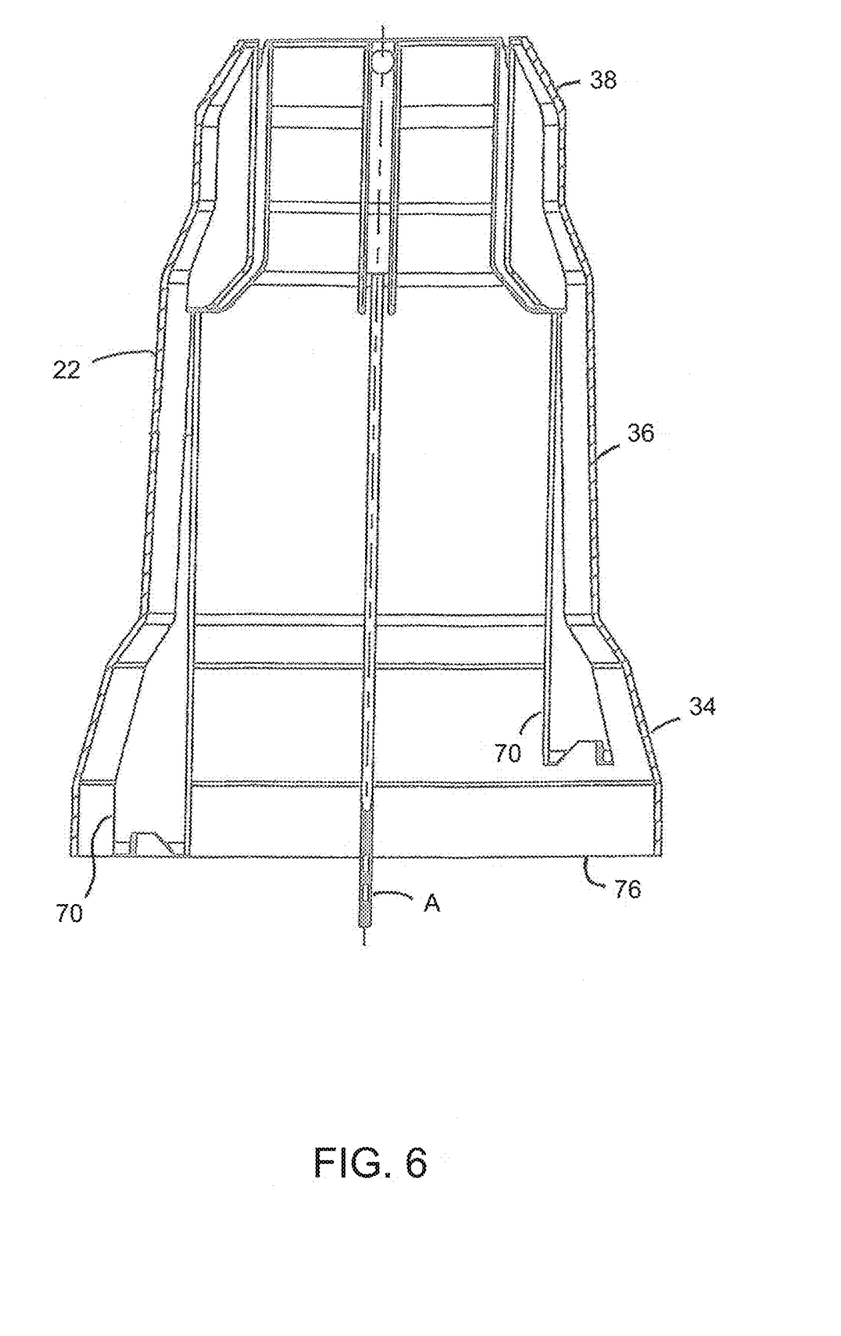
FIG. 6 is a cross section view of the feed leveler.
Figure 7A:
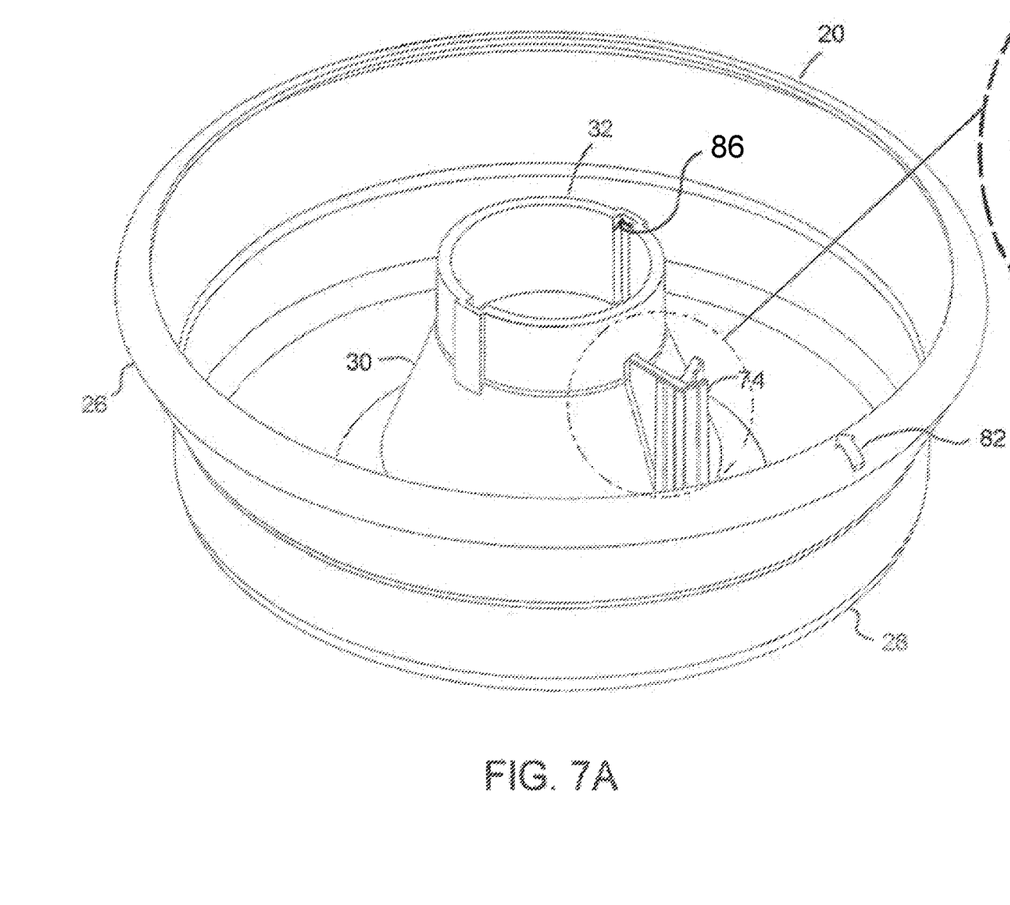
FIG. 7A is a perspective view of a feed pan of the feeder.
Figure 7B:
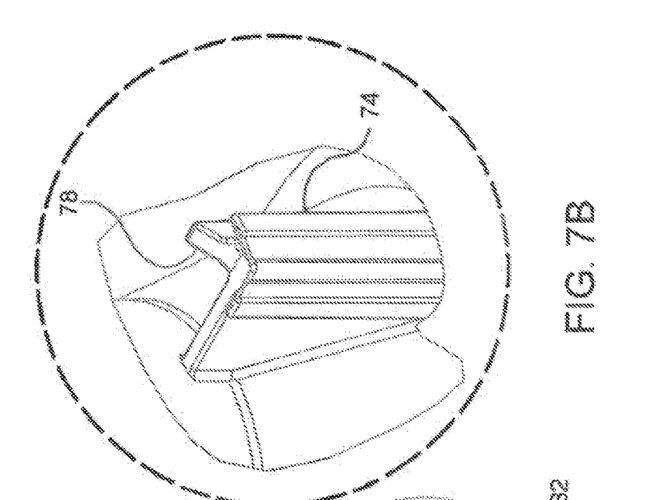
FIG. 7B is an enlarged perspective view of a portion of the feed pan.

The feed leveler 22 is configured to sit on the feed pan 20. Turning also now to FIGS. 5 and 6, the feed leveler 22 has a number of feet 70 provided on an inward facing surface 72 of the feed skirt 34, preferably at substantially equal angular intervals around the feed leveler 22. As best seen in FIG. 7A, the feed pan 20 has a pedestal 74 extending up from the pan floor 28 configured to engage with one of the plurality of feet 70. Each foot 70 of the plurality of feet 70 is positioned at a different vertical position along a longitudinal axis A of the feed leveler 22. When the foot 70 that is in alignment with the pedestal 74 rests on the pedestal 74, downward movement of the feed leveler 22 with respect to the feed pan 20 is stopped leaving the space S between a bottom rim 76 of the fed skirt 36 and the pan floor 28. The magnitude of the space S depends on the vertical position of the particular foot 70 that is in engagement with the pedestal 74. Rotation of the feed leveler 22 relative to the feed pan 20 determines which foot 70 of the plurality of feet 70 is in engagement with the pedestal 74 such that a desired feed level supply position is selected. In one embodiment, six feet 70 are provided on the inner surface of the feed skirt 36, where the feet 70 are spaced around the feed leveler 22 at substantially equal angular intervals of about 60° such that six different feed level supply positions may be selected. However, more or fewer number of feet 70 and also additional pedestals 74 may be used without departing from the scope of the invention. Accordingly, by rotating the feed leveler 22 relative to the feed pan 20, the vertical position of the feed leveler 22 relative to the feed pan 20 will change. The amount of vertical change is dependent on the vertical positioning of the feet 70 and which foot 70 is positioned to engage the pedestal 74. Desirably, the position of the lowest vertically-positioned foot 70 is such that its engagement with the pedestal 74 leaves at least a minimum desired space S to prevent feed from being totally blocked. As best seen in the enlarged view of FIG. 7B, the pedestal 74 has ramps 78 that guide the adjacent foot 70 into engagement with the pedestal 74.

A number of indicia (e.g., numbers "1", "2", etc.) 80 are provided around the circumference of the feed leveler 22. As shown in FIG. 1, indicia 80 may be provided on the feed leveler 22, preferably at substantially equal angular intervals around the leveler tube 28, and an indicator arrow 82 (See FIG. 5) may be provided on an upper rim 84 of the sidewall 26 of the feed pan 20 such that upon rotation of the feed leveler 22 relative to the feed pan 20, the arrow 82 points to a desired indicia 80 indicating that a pre-selected feed level supply position has been selected. As shown in the drawings, six indicia 80 are provided on the feed leveler 22 where each of the indicia 80 is spaced around the feed leveler 22 in registration with one of the respective illustrated feet 70. By rotating the feed leveler 22 relative to the feed pan 20 to select the desired indicia 80, the vertical position of the feed leveler 22 relative to the feed pan 20 is changed to the desired feed setting. Thus, the amount of feed that can be introduced into the feed pan 20 will be increased or decreased (depending on which direction the feed leveler 22 is rotated) where No. 1 of the indicia 80 on the feed leveler 22 denotes the least feed supply and higher indicia numbers indicate increase of feed supply amount.

According to the invention, the feed tube 20 and feed leveler 22 are configured for vertical sliding movement relative to the drop tube 24 for telescoping action of the feeder 10. In the illustrated embodiment, the mounting ring 32 at the top of the central core 30 has at least one groove 86 that mates with a rail 88 extending along the middle body portion 42 of the drop tube 24. However, one skilled in the art will understand that the grooves and rails may be positioned oppositely or that other sliding configurations may be used using sound engineering judgement. The central core 30 provides a space for movement of the retainer 66 and the bottom of the drop tube 24 with respect to the feed pan 20.

Figure 8:
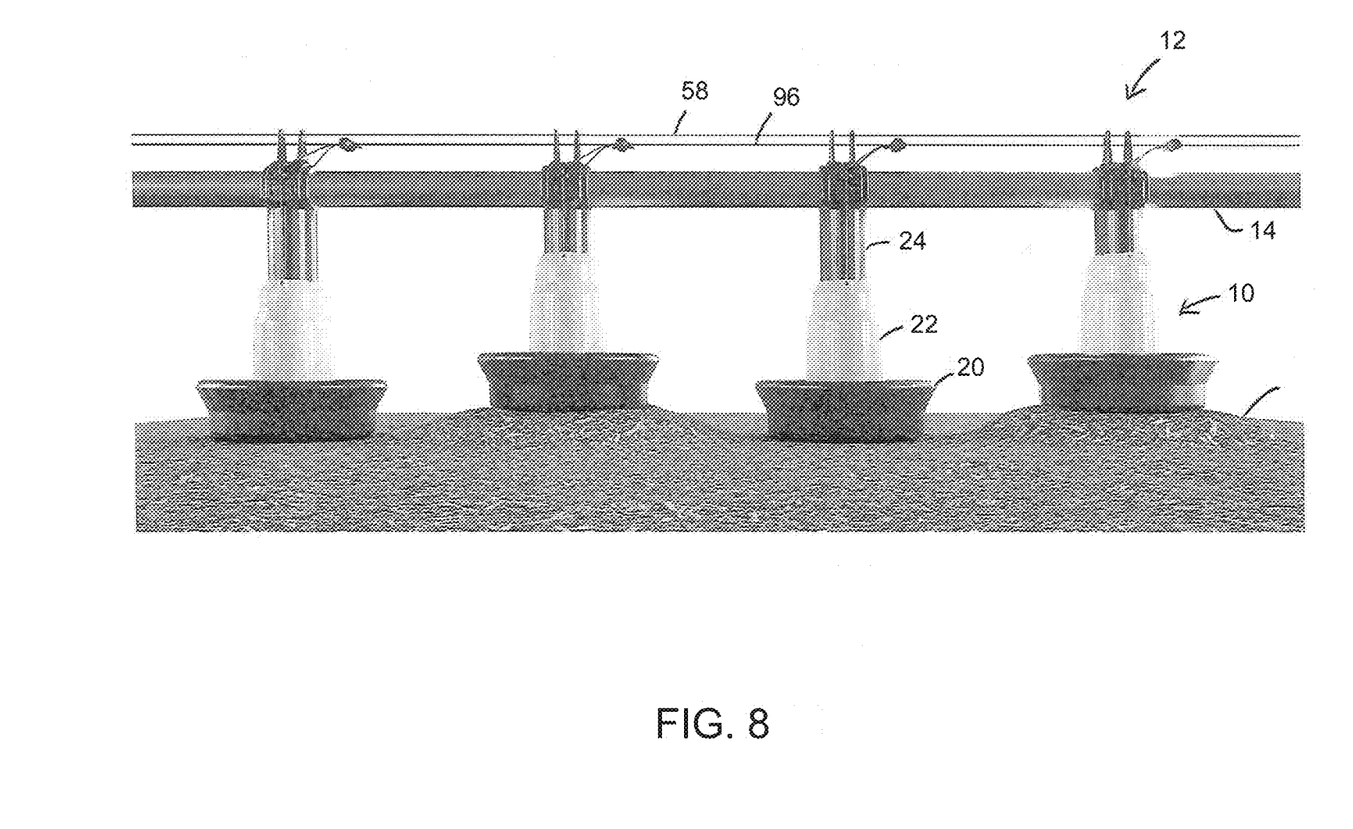
FIG. 8 is a perspective view of a plurality of feeders in a feed conveyor system.

As seen in FIG. 8, bedding B in the poultry house may be laid down such that it is uneven, with some spots higher than others. When the feed conveyer 12 with a number of feeders 10 is operating in a winch-down condition such that the feeders 10 are lowered to be in contact with the bedding, some feeders 10 may engage high bedding spots while other feeders 10 may engage low bedding spots. Ordinarily, this would cause some feeders to be forcefully buried in the bedding possibly causing misalignment of or even damage to the feeder components while other feeders 10 would be resting in the air such that they would be inaccessible to smaller birds. Telescoping movement of the illustrated feeder pan 20 and feed leveler 22 with respect to the drop tube 24 allows compensation for these variations in bedding height while still permitting all of the feeders 10 to be in contact with the bedding thereby allowing access by the chicks without undesirably affecting the feed level in each individual feeder 10. As the feed pan 20 and feed leveler 22 are free to move along the drop tube 24, there are no undesirable changes in the feed level caused by the uneven heights in the bedding.

Figure 9A:
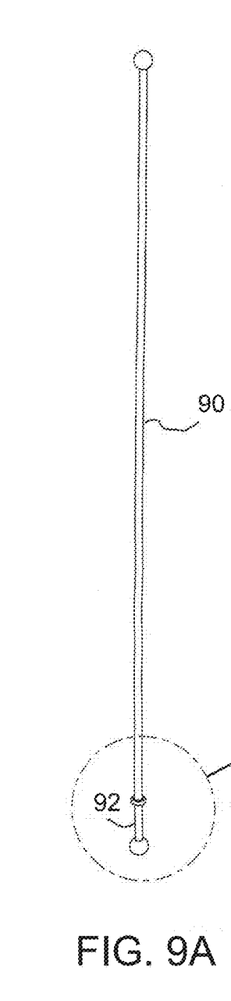
FIG. 9A is a perspective view of a cable used to raise the feed leveler of the feeder.
Figure 9B:
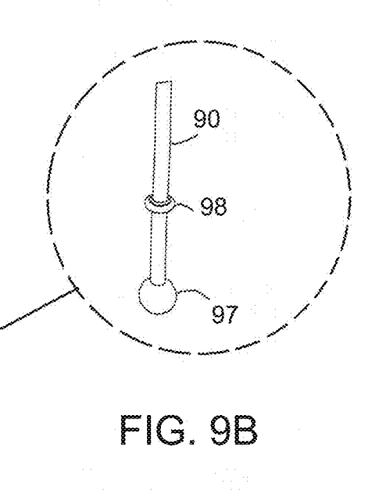
FIG. 9B is an enlarged perspective view of one end of the cable of FIG. 9A Corresponding reference characters indicate corresponding parts throughout the several views of the drawings.

However, as the birds grow, it is desirable to raise the level of each of the feeders 10 in relation to the height of the birds. The feed conveyor 12 may be used to raise the feeders 10 to a winch-up condition such that all of the feeders 10 are raised off of the bedding of the poultry house. As best seen in FIGS. 1 and 3, the feeder 10 may also have a leveler adjustment cable 90 installed with a first end 92 of the leveler adjustment cable 90 attached to the upper rim 38 of the feed leveler 22 and a second end 94 connected to a collective cable 96 that runs parallel with the conveyor tube 14. The leveler adjustment cable 90 may be routed through suitable eyelets 98 or other channeling on the drop tube 24. The collective adjustment cable 96 is attached to a suitable traction assembly (not shown) such as a winch that is used to position the collective cable 96. Movement of the collective cable 96 adjusts the leveler adjustment cable 90 for each of the feeders 10. In the collective operation mode, the feed levelers 22 for all of the feeders are adjusted at the same time by movement of the cable 96. In this collective mode, the feed leveler 22 for each of the feeders 10 is s desirably rotated such that its lowest foot 70 is aligned with the pedestal and the height of the feed leveler 22 is controlled by moving the collective cable 96 with the winch. In the embodiment of the cable 90 illustrated in FIGS. 9A and 9B, the first end 92 of the cable 90 has ball 97 that can be inserted into a well 99 in the upper rim 38 of the feed leveler 22. A catch 98 is placed on the cable 90 a small distance above the ball 97 so that when the cable 90 is in place on the feeder 10, the ball 87 and the catch 98 keep the cable 90 is the desired position.

Preferably, the main components for feeder 10, including feed pan 20, feed leveler 22, drop tube 24 and top cap 50 are injection molded (or otherwise formed) of a suitable synthetic plastic material, such as a polypropylene resin. Thus, it will be understood that certain parts of the feeder 10 may be resiliently flexible for purposes as will be herein described.

Periodically, at either the discretion of an operator or at pre-programmed times, the feed conveyor system may be actuated to deliver additional amounts of fresh feed to each of the feeders 10. It will be appreciated that as feed flows from the drop tube 24, a pile of feed will build up until the feed reaches a certain depth in the feed pan 20 as established by the size and shape of the feed pan 20, the height of the space S between the upper surface of the feed pan floor 26 and the underside of feed leveler 22. When the pile of feed blocks the flow of feed from inside the feed leveler 22, the further flow of feed is blocked and no additional amount of feed will flow through the drop tube 24 and into the feed pan 20 even though feed may be present in the drop tube 24. In this manner, the amount of feed deposited in the feeder 10 is self-limiting, even when the feed conveyor 12 continues to operate so as to deliver feed to other feeders 10 along the conveyor. In other words, the feeders 10 of the present disclosure will not be overfilled.

It will be understood that upon operation of the feed conveyor 12 of the poultry house and with shut-off slide 60 in an open position, a flow path is established for feed from the conveyor tube 14 to flow into drop tube 24. As set forth above, the feeder 10 may be operated in a winch-down condition where the feeder 10 rests on the floor of the poultry house. Alternately, the feeder 10 may be operated in a winch-up condition in which the feeder 10 is lifted off the floor such that weight of the feeder 10 is supported by the connection of the drop tube 24 and top cap 50 around the conveyor tube 14 of the feed conveyor 12.

While the feeder of the present disclosure has been described to be a broiler pan feeder intended for use in raising broiler chickens, it will be apparent to those skilled in the art that the feeder described herein may be used with all types of poultry, including other livestock, such as ducks and turkeys. As various changes could be made in the above constructions without departing from the broad scope of the invention, it is intended that all matter contained in the above description or shown in the accompanying drawings shall be interpreted as illustrative and not in a limiting sense.

The invention claimed is:

1. A poultry feeder for use with a feed conveyor in a poultry house, the feed conveyor having a rigid conveyor tube configured to receive a plurality of such poultry feeders at spaced intervals so that feed conveyed by the feed conveyor may be delivered to each of the plurality of poultry feeders upon operation of the feed conveyor, the poultry feeder having a drop tube for receiving feed from the conveyor tube that has an upper attachment portion that mounts the drop tube to the conveyor tube, a feed leveler mounted along the drop tube, the feed leveler having a lower skirt, and a feed pan having a pan floor positioned such that there is a space between the pan floor and the lower skirt of the feed leveler for the passage of feed from the drop tube in order to establish a selected layer amount of feed in the bottom of feed pan, wherein:

a middle body portion of the drop tube has a diameter that is smaller than a diameter of a feed level tube of the feed leveler such that the middle body portion nests within the feed leveler;

the feed leveler has a plurality of feet provided on an inward facing surface of the feed skirt, and the feed pan has a pedestal extending up from the pan floor configured to engage with one of the plurality of feet, wherein each foot of the plurality of feet is positioned at a different vertical position along a longitudinal axis of the feed leveler, wherein the feed leveler is rotatable with respect to the feed pan and a magnitude of the space between the pan floor and the lower skirt is determined based on which foot of the plurality of feet is selected to align with and engage the pedestal, wherein the magnitude of the space determines the selected layer amount of feed in the bottom of feed pan; and the pan floor of the feed pan has a raised central core, with a mounting ring at the top thereof, wherein a lower mounting portion of the drop tube extends through the mounting ring of the feed pan and a retainer is fastened to a bottom end of the lower mounting portion to mount the feed pan and feed leveler on the drop tube such that the feed pan and the feed leveler can slide along a vertical axis of the drop tube in a telescoping manner and the central core provides a space for movement of the retainer and the bottom of the drop tube with respect to the feed pan, wherein the telescoping movement of the feed pan and the feed leveler with respect to the drop tube does not affect the selected layer amount of feed in the bottom of feed pan.

2. The poultry feeder of claim 1 wherein the central core is frustoconical in shape.

3. The poultry feeder of claim 1 further comprising a top cap configured to mate with the upper attachment portion, wherein the top cap and upper attachment portion have a catch mechanism configured to secure the drop tube to the conveyor tube.

4. The poultry feeder of claim 1 wherein the central core of the feed pan has a diameter sufficient that the retainer fits within an underside of the central core such that the feed pan can rest on the bedding of the poultry facility without interference from the retainer.

5. The poultry feeder of claim 1 wherein the plurality of feet are at equal angular intervals around the feed leveler.

6. The poultry feeder of claim 1 wherein when the foot that is in alignment with the pedestal rests on the pedestal, downward movement of the feed leveler with respect to the feed pan is stopped leaving the space between a bottom rim of the fed skirt and the pan floor.

7. The poultry feeder of claim 6 wherein the feet are spaced around the feed leveler at substantially equal angular intervals and rotating the feed leveler relative to the feed pan, the vertical position of the feed leveler relative to the feed pan will change.

8. The poultry feeder of claim 6 wherein a position of the lowest vertically-positioned foot of the plurality of feet is such that its engagement with the pedestal leaves at least a minimum desired space so as to prevent feed from being totally blocked from passing under the feed skirt.

9. The poultry feeder of claim 6 wherein the pedestal has ramps that guide an adjacent foot of the plurality of feet into engagement with the pedestal.

10. The poultry feeder of claim 6 further comprising a plurality of indicia are provided around the circumference of the feed leveler, wherein each indicia of the plurality of the indicia is in registration with one of the plurality of feet such that rotating the feed leveler relative to the feed pan to select one of the indicia causes the vertical position of the feed leveler relative to the feed pan to be changed to a desired feed setting.

11. The poultry feeder of claim 1 wherein the mounting ring at the top of the central core has at least one groove that mates with a rail extending along the middle body portion of the drop tube.

12. A poultry feed system for use in a poultry house having an uneven litter bed, the poultry feed system comprising:
a feed conveyor having a rigid conveyor tube;
a plurality of poultry feeders according to claim 1, the poultry feeders attached at spaced intervals along the conveyor tube so that feed conveyed by the feed conveyor is delivered to each of the plurality of poultry feeders upon operation of the feed conveyor, each poultry feeder of the plurality of poultry feeders being identically configured such that its feed leveler can be rotated with respect to its feed pan so that a selected foot of the plurality of feet engages the pedestal so that each poultry feeder has the same selected layer amount of feed in the bottom of the feed pan, wherein telescoping movement of the feed pans and the feed levelers relative to their respective drop tube can cause each feed pan to rest on the uneven litter bed even though a vertical distance between the rigid conveyor tube and each of the feed pans may be different due to the uneven litter bed, wherein such telescoping movement does not affect the selected layer amount of feed in the bottom of each of the feed pans.

* * * * *